United States Patent
Ware et al.

(10) Patent No.: US 8,195,907 B2
(45) Date of Patent: Jun. 5, 2012

(54) TIMING ADJUSTMENT IN A RECONFIGURABLE SYSTEM

(75) Inventors: Frederick A. Ware, Los Altos Hills, CA (US); Ian Shaeffer, Los Gatos, CA (US); Scott C. Best, Palo Alto, CA (US); Craig E. Hampel, Los Altos, CA (US)

(73) Assignee: RAMBUS Inc., Sunnyvale, CA (US)

( * ) Notice: Subject to any disclaimer, the term of this patent is extended or adjusted under 35 U.S.C. 154(b) by 853 days.

(21) Appl. No.: 12/258,680

(22) Filed: Oct. 27, 2008

(65) Prior Publication Data

US 2009/0164677 A1 Jun. 25, 2009

Related U.S. Application Data

(60) Provisional application No. 61/008,720, filed on Dec. 21, 2007.

(51) Int. Cl.
*G06F 1/08* (2006.01)
*G06F 13/16* (2006.01)
(52) U.S. Cl. .................... 711/167; 711/105; 713/501
(58) Field of Classification Search ...................... None
See application file for complete search history.

(56) References Cited

U.S. PATENT DOCUMENTS

| | | | |
|---|---|---|---|
| 6,530,001 B1 * | 3/2003 | Lee | 711/154 |
| 6,686,762 B2 * | 2/2004 | Leddige et al. | 326/30 |
| 6,948,043 B2 * | 9/2005 | Barr et al. | 711/170 |
| 7,321,979 B2 * | 1/2008 | Lee | 713/600 |
| 7,392,372 B2 * | 6/2008 | Chu et al. | 713/1 |
| 2005/0132158 A1 * | 6/2005 | Hampel et al. | 711/167 |
| 2007/0162668 A1 * | 7/2007 | Shaeffer | 710/68 |

* cited by examiner

*Primary Examiner* — Gary J Portka
(74) *Attorney, Agent, or Firm* — Marc P. Schuyler

(57) ABSTRACT

This disclosure provides a method for adjusting system timing in a reconfigurable memory system. In a Dynamic Point-to-Point ("DPP") system, for example, manufacturer-supplied system timing parameters such as access latency and maximum clock speed typically reflect a worst-case configuration scenario. By in-situ detecting actual configuration (e.g., whether expansion boards have been inserted), and correspondingly configuring the system to operate in a mode geared to the specific configuration, worst-case or near worst-case scenarios may be ruled out and system timing parameters may be redefined for faster-than-conventionally-rated performance; this is especially the case in a DPP system where signal pathways typically become more direct as additional modules are added. Contrary to convention wisdom therefore, which might dictate that component expansion should slow down timing, clock speed can actually be increased in such a system, if supported by the configuration, for better performance.

30 Claims, 5 Drawing Sheets

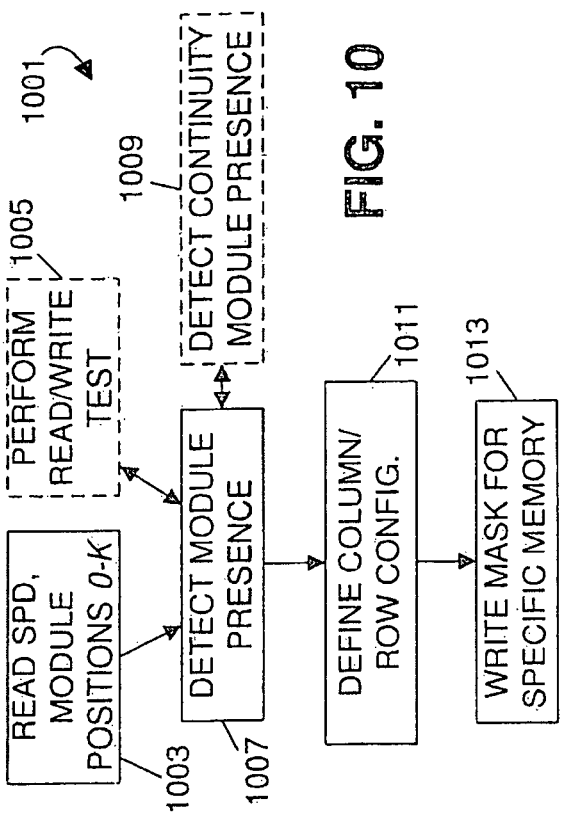
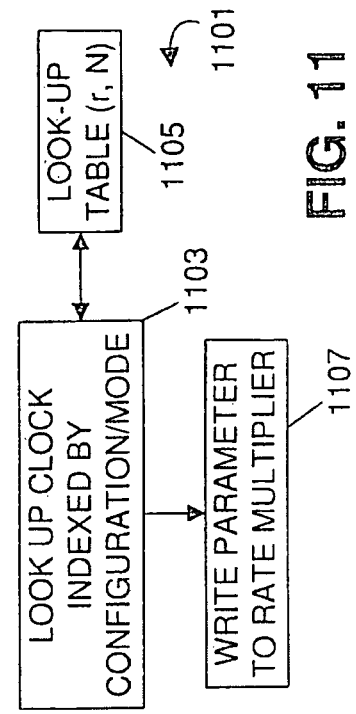
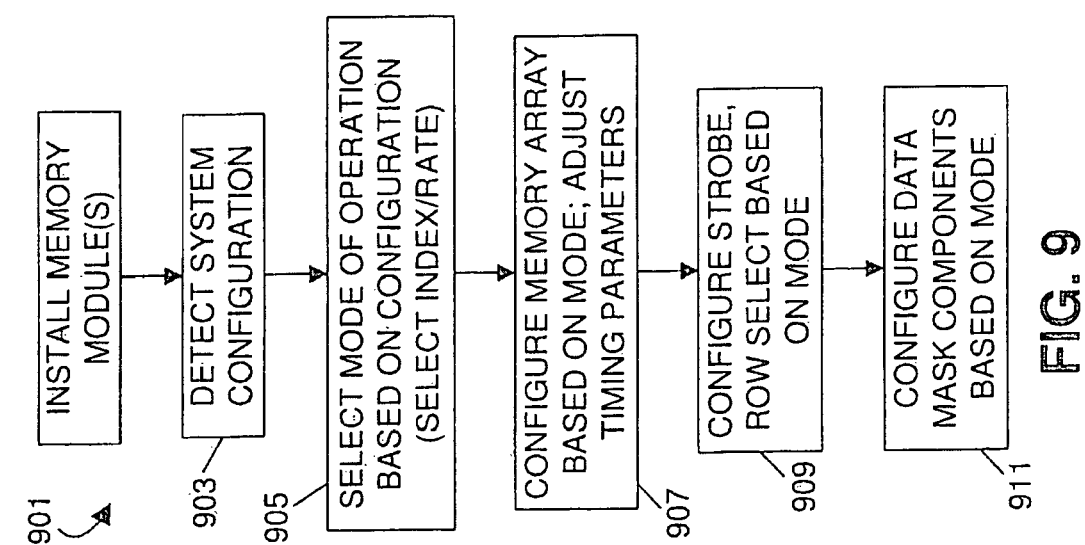

TIMING ADJUSTMENT IN A RECONFIGURABLE SYSTEM

CROSS-REFERENCE TO RELATED APPLICATIONS

This application claims the benefit of the filing date of U.S. Provisional Patent Application No. 61/008,720 filed Dec. 21, 2007, the disclosure of which is hereby incorporated herein by reference.

This disclosure relates to electronic signaling within and between integrated circuits.

BACKGROUND

In the computer industry, processor instruction speeds are starting to outpace component operating speeds, with the result that components can limit the computer to operation only at a maximum speed dictated by the component. One cause of these limitations has to do with signal path routing; as densities become greater, impedance mismatch from pin connectors, three-dimensional path routing and path crowding can impart transient effects to computer signals; these transient effects make it more difficult to sense voltage changes and, in general, require a greater delay in order to detect pulse edges, propagate pulse edges and obtain accurate data reads. Dynamic point-to-point systems provide one solution to this problem by dynamically minimizing data path routing and expansion connections. Dynamic point-to-point systems typically feature a fixed routing scheme with multiple, parallel input/output ("IO") paths; as new components are added to the system, the existing components and new components are reconfigured to operate in parallel, with capability to select different IO paths, i.e., as modules are added, responsibility for data may be spread across multiple modules, with some paths (and in some cases, the least direct paths) being left unused. Each of the paths couple one controller IO with one memory IO. The paths relied upon for data operations are those that result in the most direct (and "cleanest") connection. While useful for their intended purpose, even dynamic point-to-point systems can provide less than optimal performance; these systems conventionally have operational limits pre-defined by their least efficient routing scheme, with the result that even dynamic point-to-point systems can encumber relatively faster CPU systems.

BRIEF DESCRIPTION OF THE DRAWINGS

FIG. 1 shows a method where a system configuration is established, and where performance is adjusted in dependence upon the configuration.

FIG. 2 illustrates steps that may be performed during a configuration mode, with the memory system clock being adjusted to a rate geared for the actual configuration of the memory system, i.e., a maximum rate that depends on whether an optional memory module is present.

as seen in FIG. 3, the controller configures the system and adjusts timing depending upon the routing of communications with respect to the second memory interface (i.e., having boxes "A" and "B" in FIG. 3).

FIG. 6 indicates four possible locations where memory modules may be connected. FIG. 6 also shows a dotted line box labeled "BIOS," indicating that in one embodiment, some or all of the configuration functions may be performed by system BIOS.

FIG. 8 illustrates a system similar to the one depicted in FIG. 7, but in which continuity modules have been replaced with additional memory, such that memory modules occupy all four interface slots.

FIG. 9 shows a process of adding additional memory and associated reconfiguration of both existent memory and newly added memory.

FIG. 10 shows a process of detecting whether a memory module is present at a given location and configuring the resultant memory array. As indicated in dashed lines at the right of FIG. 10, two additional or alternative processes may be employed, including specifically detecting whether a continuity module is present and detecting memory module presence by performing test read/write operations.

FIG. 11 shows the use of a lookup table to configure timing in dependence upon system configuration.

DETAILED DESCRIPTION

The technology summarized above and defined by the enumerated claims may be better understood by referring to the following detailed description, which should be read in conjunction with the accompanying drawings. This description of one or more particular embodiments, set out below to enable one to build and use various implementations, is not intended to limit scope of the disclosed technology, but to exemplify its application to certain methods and devices. The description set out below exemplifies a specific, reconfigurable memory system where the timing parameters can be fine tuned as memory is reconfigured. The principles discussed herein, however, may also be applied to other methods and devices as well.

The principles disclosed herein may be embodied in a method of taking advantage of better possible performance as computer component configuration is changed. In this regard, conventional computing devices are often calibrated under the assumption of a worst-case scenario. For example, in a reconfigurable memory system which is sold with baseline memory and connectors or slots for adding memory, memory data rates are often deliberately limited by the designer to match the slowest performance obtainable, given possible combinations of memory and unfilled expansion slots. Conventionally, the designer would experiment with different expansion combinations and define clock rates to correspond to times when data signals are expected to become reliable. That is to say, in any given system, signal reflections and impedance values reduce the data eye opening at the receiving device. The worst-case assumptions are typically used as system limitations, even when possible configurations of the system are capable of better-than-worst-case performance.

Figure 1:
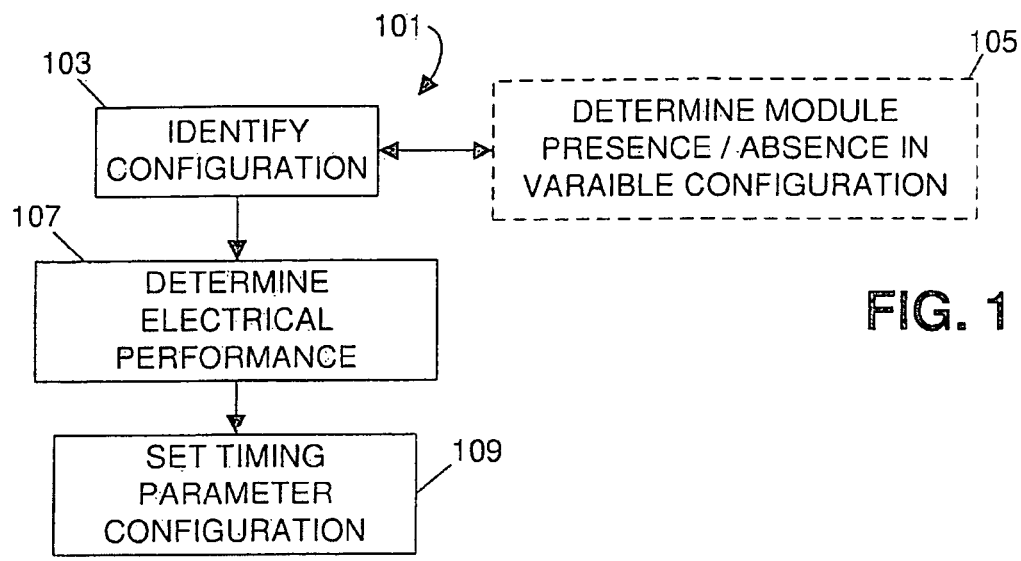
FIG. 1 is a flow chart that reflects principles of the present disclosure; more particularly.

As seen in FIG. 1, one embodiment presents a method of addressing this problem by setting timing parameters based on system configuration. The method 101 calls for identifying system configuration, as indicated by block 103. More particularly, in one embodiment, the method may perform this function by determining module presence or absence in a variable configuration, as indicated by block 105. Module presence or absence, and in particular, the electrical performance of the system as impacted by this presence or absence, may influence how quickly data signals become valid and therefore timing parameters may be improved to take advantage of better data validity times depending on system configuration and depending on whether an expansion slot has been filled. As indicated by reference numerals 107 and 109 in FIG. 1, once system configuration is identified, the system then determines electrical performance and responsively sets a timing parameter. To provide an example, if the worst-case scenario occurs when no expansion module is present, the system detects whether an expansion module is present and rules out the worst-case electrical performance scenario if a module is indeed present; in this event, system timing parameters can be reset to faster levels to provide improved system performance and to minimize the likelihood that the system will encumber a relatively faster master system.

Thus, contrary to conventional wisdom, which calls for setting system timing to reflect a single, worst-case scenario, a designer may supply a number of timing scenarios, each corresponding to a different system configuration. In operation, the system may then detect actual configuration and implement more accurate timing scenarios, calibrated for the specific configuration in question.

Figure 2:
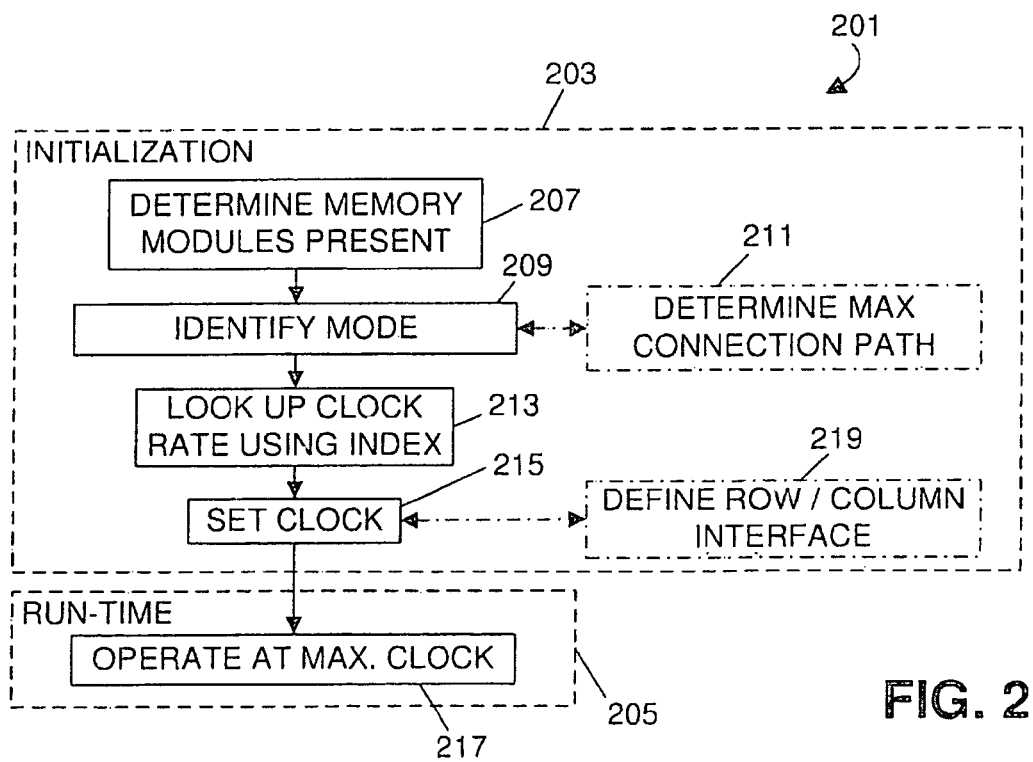
FIG. 2 shows an adjustment method applied to a memory system. In particular.

FIG. 2 illustrates a method of timing parameter adjustment for use in a memory system. In particular, FIG. 2 shows a method 201 that includes an initialization mode 203 and a run time mode 205. During the initialization mode, the system determines whether a memory module is included in the system, as indicated by operational block 207. In this regard, a conventional memory system that is configured with a number of connectors, each adapted to connect to a memory module. Spare connectors are often provided for addition of modules to expand memory at a later time. Each memory "module" in this regard may consist of a memory device adapted for insertion into the system in a modular manner, and may consist of a single memory chip or a board with a large number of resident chips or memory buffers. For purposes of the discussion of FIG. 2, it should be assumed that each module includes a printed circuit board having a localized memory controller, system input/output interface, and a number of memory chips. The memory controller typically would include localized Electronically Erasable Programmable Read-Only Memory ("EEPROM") having system information, executable code for managing on-board memory, and localized parameters for responding to memory requests, all presented in a standardized manner, adapted for ready external interaction.

In determining whether memory is present, the system is in practice programmed to poll a number of predefined locations corresponding to memory connections where memory modules might be present. This polling may occur in a variety of different ways, as will be explained further below. Based on memory modules present or absent, the system determines a time needed for accurate or valid data operations, as represented by processing block 209 in FIG. 2. As mentioned earlier, three dimensional path routing may result in impedance variations that create reflections and otherwise affect how clean a signal, and any associated edges, are presented to a recipient device; typically, interference from these elements is transitory and therefore creates a propagation delay that must be observed before detection by sense circuitry can be presumed accurate. Addition or subtraction of memory modules may influence this timing, and the method of FIG. 2 therefore identifies the actual memory configuration to determine the pertinent timing parameters. As indicated by processing block 213 and 215, the timing parameter may include a system clock speed. For example, if the data signal is relatively "clean," meaning that paths are relatively straight with relatively constant impedance, signal validity delays will be less. As a consequence, for a cleaner data path, a relatively faster clock rate may be applied. The same may be said for other timing parameters such as initial memory access latency and other timing parameters.

With timing parameters for maximum data rate operation determined for a given memory module configuration, the system may be fine-tuned to rule out the worst-case scenario, or other relatively slow timing scenarios. For example, if all expansion slots are filled, yet the system default represents a worst-case timing scenario where all expansion slots are empty, the system can actually rule out the worst-case, ignore the default and operate at better timing and a higher data rate.

As indicated by reference numeral 219 in FIG. 2, the system may reconfigure data path routing to for purposes of general memory reconfiguration, or when memory modules are added, moved or removed; for example, the system's memory array may be configured to split multiple columns of memory (i.e., subsets of data bus width) across multiple modules, thereby promoting smaller memory system access granularity and further optimizing performance. In a hypothetical gaming system, for example, it may be desired to store data in the form of 64-bit data words, and yet provide independent access to the first, second, third or fourth least significant sixteen bits without affecting the other bits. To create further system operating efficiencies, it may be desired in some implementations to automatically re-configure memory in this manner any time additional memory is added to the system.

Figure 3:
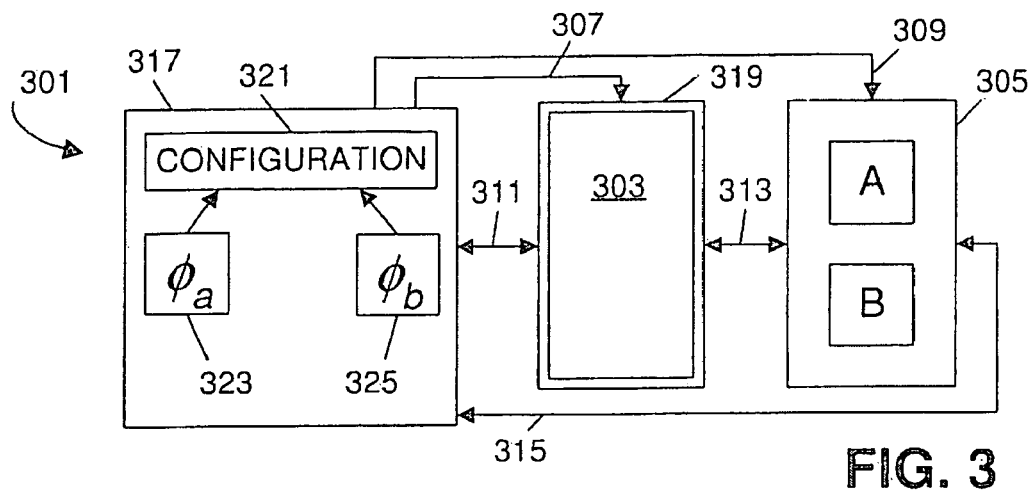
FIG. 3 is block diagram of a memory system including a controller, and two memory module connectors or interfaces.

Improvements in operational efficiency can be particularly significant in the case of dynamically-reconfigurable systems; FIG. 3 presents a block diagram of a simplified Dynamic Point-to-Point ("DPP") memory system 301, which may have data rates adjusted as data path routing is dynamically reconfigured.

This system 301 is schematically shown to include a first memory module 303 and a memory connector 305 that is adapted to receive an optional second memory module (not shown in FIG. 3). The "module" may consist of a memory chip, a memory board including a plurality of chips, or a self-contained memory subsystem (having a localized subsystem controller, EEPROM and similar system support circuitry), or any other element that may be modularly connected. Advantageously, the memory may be configured to be dynamic random access memory configured as a dual in-line memory module ("DIMM"), having two parallel input/output ports (input/output will hereafter be referred to as "IO" and it should be understood that this term refers to data paths or devices used for input and output as well as both input and output). The system is configured to have chip select, write enable and other appropriate control paths coupled to each memory location, as collectively referenced by numerals 307 and 309, respectively. These paths may also include serial bidirectional data couplings, such as may be used for module interrogation, as will be discussed further below.

FIG. 3 illustrates a configuration where the first memory module has two ports and associated IO paths, labeled 311 and 313, each of which can be configured to provide half of the IO data needs for the specific memory module; for example, if the first memory module has a capacity of 256 MB of memory and a parallel data bus width of 64 bits, then each of pathways 311 and 313 may be configured to carry 32 bits of parallel data.

The memory connector or interface 305 for the optional second memory module is depicted in FIG. 3 as including two boxes, labeled "A" and "B" respectively, representing two alternate configurations. In particular, box "A" denotes a configuration where no second memory module is present, e.g., where an expansion connector has not yet been filled with memory, and box "B" denotes a configuration where a second memory module is present and is operationally connected to the system. For purposes of this discussion, it may be assumed that the second memory module if present is identical in configuration to the first memory module 303, i.e., when added, it effectively doubles the memory capacity of the system 301.

The advantage of a dynamic point-to-point system should therefore be readily apparent; with fixed communication routing, the system 301 may be easily reconfigured without having to manually reroute cabling or other connectors as an additional module is added. In particular, it should be noted that in FIG. 3, data path 313 connects the first memory module to the connector 305 for the optional, second memory module, and a second bank of pathways from the connector (designated 315) couples the connector directly to a system IO 317. [The system IO may consist of a memory subsystem controller or an IO bus, typically with multiplexing capabilities to mask and sort data signals to appropriate bit lines, and a buffer at system output to provide interface with external systems having different system clocks.] The first memory module may be mounted in a dedicated memory connector 319 identical to the connector 305 and thus, using the 64 bit example introduced above, each memory connector 305 and 319 is configured to have two ports, each carrying 32 bits of data, with one port of each connector connected directly to system IO 317 (and not to the other connector) and the other port connected to the other connector (this communication path is represented by reference numeral 313 in FIG. 3).

In particular, when the configuration represented by box "A" is utilized, pathways 313 and 315 are shorted to each other, such that both banks of IO lines from the first memory module are coupled to the IO interface 317; half of the bit lines are connected directly to the interface, and thus are ideally configured to provide direct routing designed to minimize impedance variation, and the other half of the bit lines are routed through the memory connector 305 for the optional expansion module. Because this second set of parallel bit lines are routed through this connector, impedance variation caused by impedance mismatches through the connector and from three-dimensional path routing may provide less than optimal performance and may limit overall system performance.

This issue is addressed by utilizing a configuration function, labeled 321 in FIG. 3. In particular, the system 301 advantageously detects whether memory is present in the memory connector 305 and responsively both reconfigures overall memory organization and adjusts its data timing. As indicated by two blocks 323 and 325, the system may define a timing parameter (such as frequency) to have one of two values, $\Phi_a$ or $\Phi_b$, depending on whether the optional, second memory module is inserted into the connector. It should be noted that the Greek character $\Phi$ in this example is used to denote clock speed, but other timing parameters may also be optimized, including latency for first data access (e.g., corresponding to latencies for device pre-charge, chip select, row and column select, write and read select, and other memory access latencies). That is to say, in the scenario depicted by box "A," which represents no active memory in the connector 305, 32 bits from the first memory module are preferably routed through connector 305, and since this signal path is less than optimal, the system will experience relatively greater data access times during which it must await attenuation of transient effects on affected signal lines; the timing parameter $\Phi_a$ is utilized in this scenario.

Figure 4:
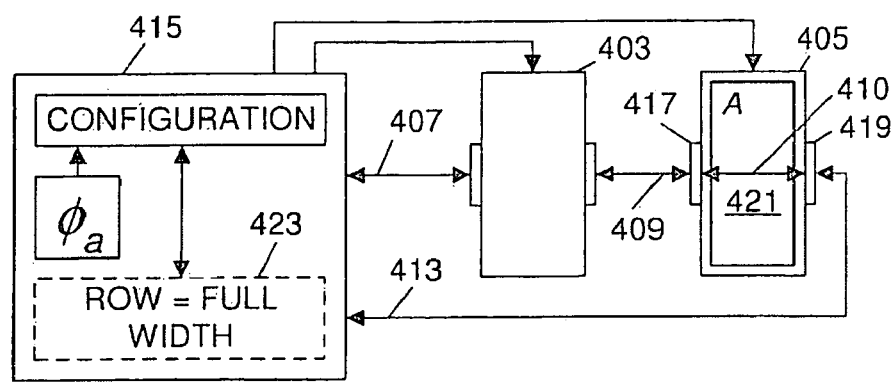
FIG. 4 is a block diagram similar to FIG. 3, but where some communications from a first memory module are routed through a connector for second memory module; responsive to a determination of this routing (and associated system configuration), the system is adjusted to use a first timing parameter value ($\Phi_a$).

FIG. 4 further illustrates a configuration where communications from a first memory module 403 are routed through a connector 405 for an optional second memory module. Half of the overall parallel data bus width is seen as being routed through this connector, via pathways 409, 410 and 413, to the system IO 415. This routing introduces additional pin connections (collectively identified by 417 and 419), which may introduce additional impedance discontinuities to half of the data bus, as well as other signal degradations, such as crosstalk. FIG. 4 illustrates that a continuity module 421 has been inserted into the memory connector in order to perform this routing; that is to say, the dynamic point-to-point scheme in this example uses a module that shorts together reciprocal pairs of data pins (417 and 419), as indicated by reference arrow 410. In this scenario, to take full advantage of the 64 bit wide parallel bus, the first memory module 403 is configured as an array of 4M rows, each 64 bits wide (for 256 MB memory devices), as indicated by dashed line block 423 in FIG. 4.

Figure 5:
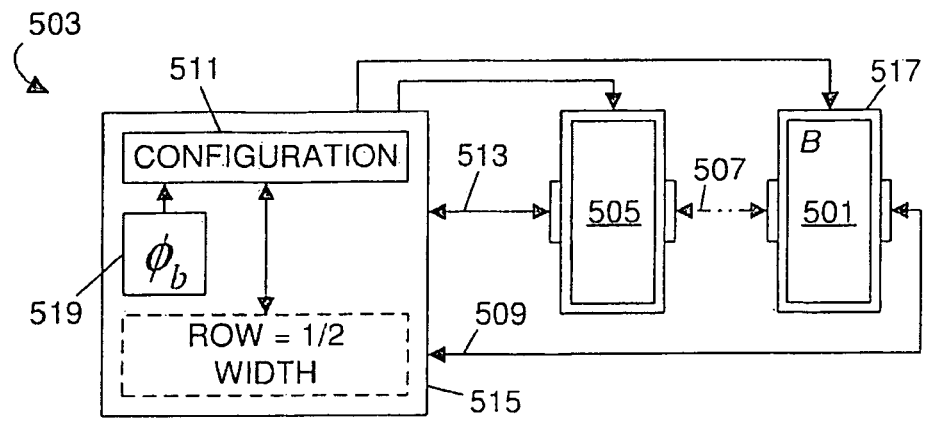
FIG. 5 is a block diagram similar to FIG. 3, but where no communications from a first memory module are routed through the interface; responsive to a determination of this configuration, the system is adjusted to use a second timing parameter value ($\Phi_b$). A communication path between memory modules in FIG. 5 is illustrated via a dotted line, to indicate that this path is not relied in this configuration for memory data operations.

FIG. 5 illustrates a configuration where the continuity module has been removed and a second memory module 501 is instead operationally connected to the system 503. In this example, it will be assumed for purposes of discussion that the second memory module 501 is identical to a first memory module 505, e.g., each device has a capacity of 256 MB. Because the continuity module is removed, pathways 507 and 509 are no longer shorted to each other, and a configuration function redefines memory organization such that each memory module, 501 and 505, is configured to store data rows corresponding to one-half of the data bus width; in the example of a 64 bit wide bus and a device capacity of 256 MB, for example, each memory module might be reconfigured by the system 503 to store 8M lines of 32 bits width, and would use only those data pathways 509 and 513 that directly couple this data with system IO 515. That is to say, dynamic point-to-point methodology organizes memory such that, as memory is added, the less direct, less "clean" communication paths (pathway 409-410-413 in the example depicted by FIG. 4) are discarded in favor of more direct, "cleaner" routing. As this occurs, overall transient waiting periods for data validity become less, and the system may be able to operate more efficiently than reflected by predefined worst-case assumptions. To address this issue, the configuration function 511 monitors the memory connector 517 used for expansion and may redefine timing as memory is changed. Reference numeral 519 in FIG. 5 reflects the definition of a timing parameter to a new value, optimized based on the addition of the second memory module 501 and the fact that pathway 507 is not depended upon to carry parallel data for memory operations. The new value, depicted $\Phi_b$ in FIG. 5, reflects faster timing that the value of $\Phi_a$ (referred to in FIGS. 3 and 4). Each of these values may be empirically determined by the hardware designer, using a variety of memory devices and configurations, and may be supplied as part of the configuration function, e.g., via firmware, software, or otherwise for configuration purposes.

Dynamic point-to-point systems can therefore permit module expansion using fixed wiring, without requiring any manual rerouting of connection beyond the addition of the new modules themselves, and modules can be configured automatically by a system controller or via software (e.g., firmware or BIOS). As can be seen with this example of a reconfigurable system, faster-than-conventional system rating can be achieved as modules are added, because data connection pathways in fact become more direct and "cleaner." This ability is counterintuitive because conventionally, expansion of a system to include additional components or memory (given conventional connection schemes) would normally suggest slower timing needed to communicate with more components and a more expansive system.

It should also be noted that the embodiments discussed above refer to use of a continuity module to perform routing for open connectors; there are contemplate embodiments that do not require modules to provide continuity; for example it is possible to design memory connectors that themselves provide continuity switching in the absence of a memory module, and other methods are also possible.

Figure 6:
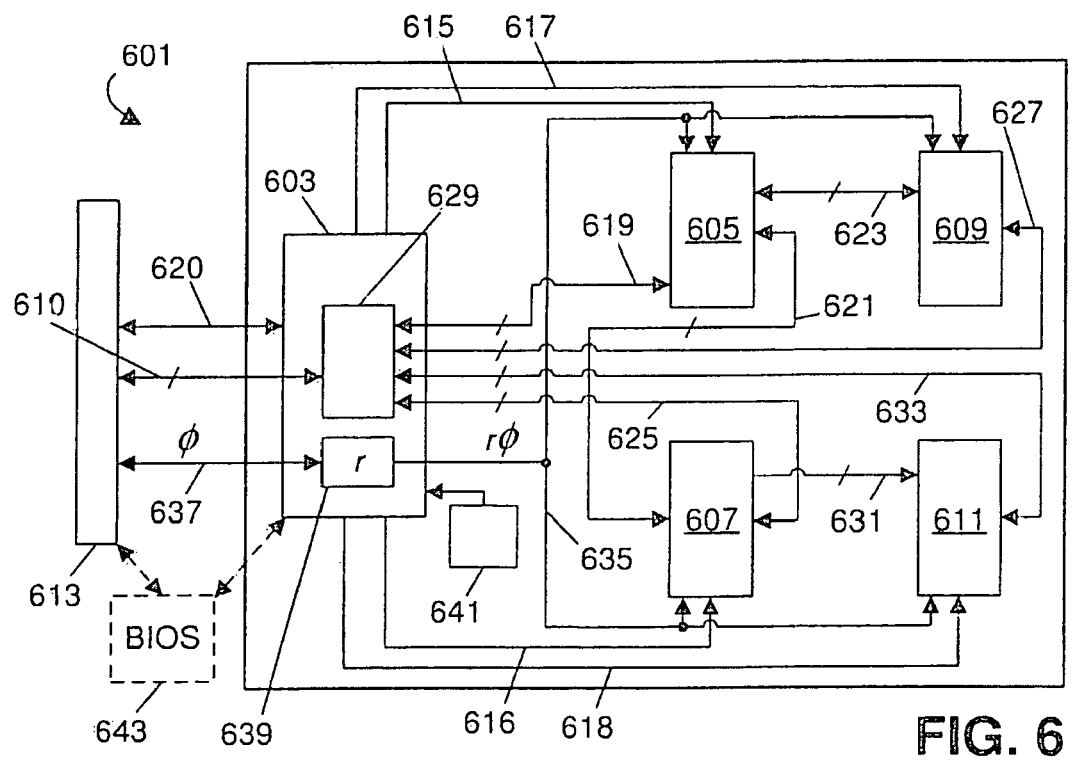
FIG. 6 is a block diagram of a memory subsystem where a memory controller uses machine readable instructions to configure subsystem operation.
Figure 7:
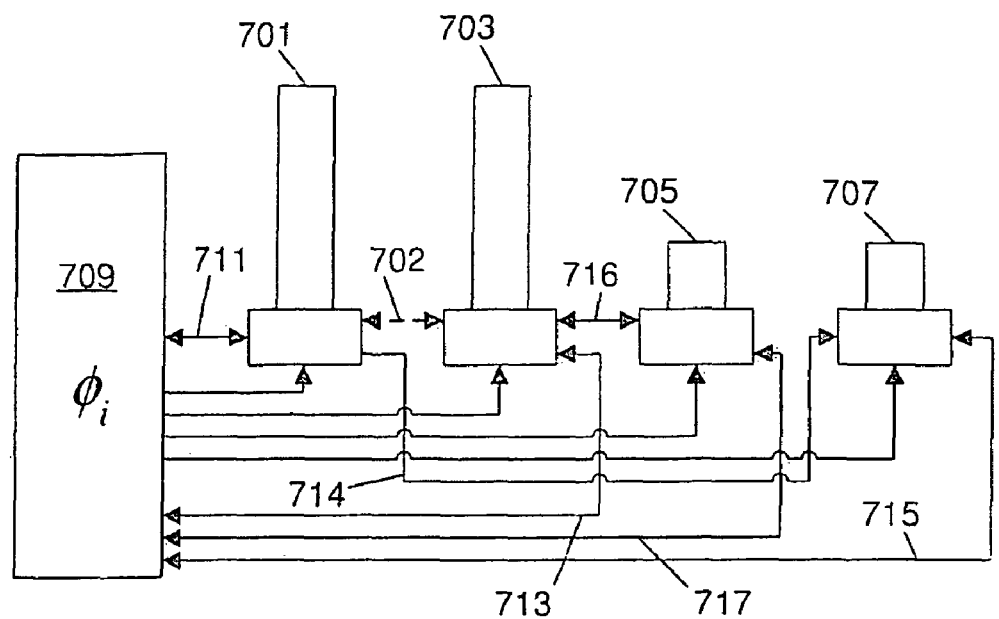
FIG. 7 illustrates another embodiment of a memory system, where continuity modules are positioned in expansion slots and are removed as memory is expanded. The continuity modules serve to relay communications between existing memory modules and system IO via otherwise empty expansion slots.
Figure 8:
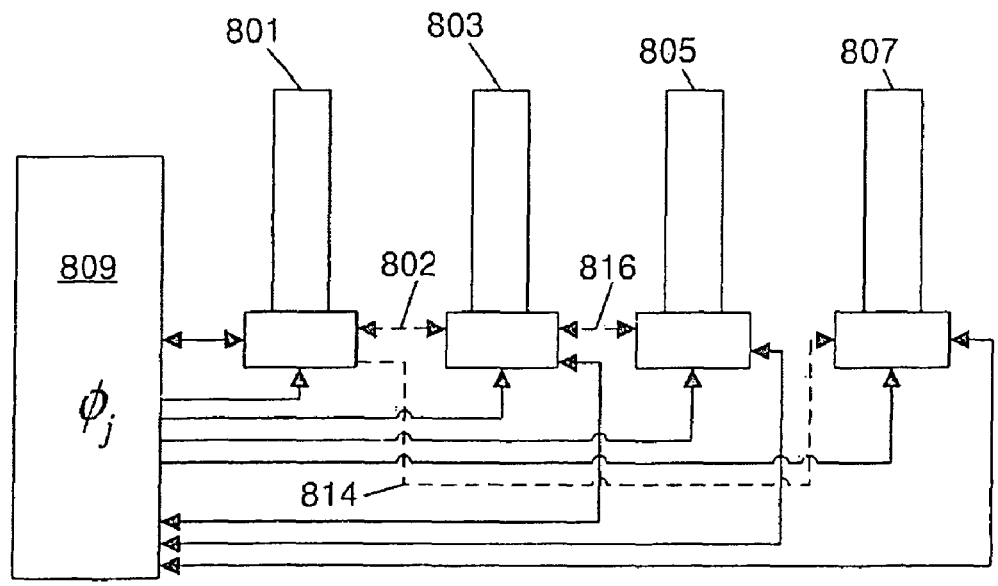
FIG. 8 shows four memory interface slots, with memory modules having been inserted in the two left-most slots, and continuity modules present in the two right-most slots.

FIGS. 6-8 are used to show the application of these principles to an expansion system having four connectors, i.e., a system having one module that accompanies initial sale and as many as three expansion connectors or expansion slots.

FIG. 6 shows a block diagram of a memory subsystem 601 having a memory controller 603 and four interface slots 605, 607, 609 and 611, each adapted to receive a memory module. In this example, it should be assumed that each module is configured as a memory card, itself having a number of memory chips, an on-board controller, and other suitable circuitry. The subsystem 601 may be employed in any conventional computing device 613, including without limitation a personal computer ("PC"), server, video gaming device, or blade server or other high-end computer. Further, in this example, dynamic point-to-point connection is performed at subsystem level, using modules configured as multi-chip memory boards (whereas FIGS. 3-5 and the description above employed a chip-level example). FIG. 6 depicts parallel data bus connections as having a crossing "slash," to indicate that multiple signal paths form a part of the associated bus; this notation is used in FIG. 6 only for purposes of the parallel data bus connections, to facilitate the discussion below, but it should be understood that other connections in the figures may consist of multiple communication lines (such as for example chip select, write enable, serial, power, and other communication circuitry, labeled 615-618 in FIG. 6, and subsystem control communications 620).

Conventionally, the subsystem 601 may be sold having a baseline amount of memory, such as a single memory card inserted in slot 605, and dynamic point-to-point routing, with continuity modules present in the other three slots 607, 609 and 611. In one configuration, data bus communications from the first slot 607 may be split between a direct connection (represented by numeral 619 in FIG. 6) and two indirect connections 621 and 623, which pass through slots 607 and 609 respectively. For example, if the subsystem supports a 64 bit wide parallel bus 610, the direct connection might be configured to carry 16 bits of data, one indirect connection 621 might carry 32 bits of data, and a second indirect connection 623 might carry the remaining 16 bits of data. Since in this example each of slots 607 and 609 would have a continuity module (not separately indicated in FIG. 6), each connection would be shorted by the continuity module with another data bus; slot 607 (which would receive 32 bits from the single memory card at slot 605) passes 32 bits of data out, including 16 bits directly connected with a system IO buffer 629, via connection 625, and 16 bits of data connected with the fourth slot 611. [In practice, each of connections 619, 621, 623, 625, 627 and 629 may be made to have a consistent width, e.g., using 32 bit wide bus, with bit lines not carrying valid data ignored or masked by software in order to permit the greatest design flexibility possible and to address filling of slots in arbitrary order.] In this example, it will be seen that some data (e.g., the 16 bits of data carried by connection 619) is directly coupled between memory and system IO 629, while some data is coupled through one continuity module (e.g., 16 bits of data conveyed by connections 621/625 and 16 bits of data conveyed by connections 623/627); some data is also indirectly coupled through two continuity modules (e.g., 16 bits represented by connection path 621/631/633). This configuration is not the only possible configuration of the subsystem 601, i.e., the system could be dynamically configured to ignore two slots (e.g., with 32 bits being routed through only one of slots 607 or 609, directly to the system IO buffer 629, and not routed through the other of these slots), but this point is noted for purposes of illustrating that a large number of timing parameter values may be used for many different module configurations.

For example, in the example just used where connection path 621/631/633 presents a path with undesirable impedance variations, the system could use a relatively slow timing parameter to reflect a worst-case scenario for the subsystem 601. With reference to FIG. 6, the subsystem may derive a subsystem clock speed 635 from a master system clock 637 using a rate multiplier 639. As a control function identifies system configuration, for example, during system initialization with each power-up, the system can associate an index with the identified configuration to access a lookup table (not separately labeled in FIG. 6) and retrieve an appropriate clock speed or scalar from the lookup table in order to suitably derive memory system clock speed 635; such a scalar is represented by the variable "r" in FIG. 6. The scaled clock speed may represent slowest, worst-case timing in the event that very indirect communication paths are utilized for data communication (e.g., path 621/631/633 in FIG. 6); a faster clock speed may be used in a configuration where only somewhat indirect paths are utilized (e.g., with communication routed through a single continuity module only). Finally, if the subsystem 601 is expanded to have a memory card occupying each slot 605, 607, 609 and 611, the fastest clock speed may be used, reflecting the fact that all communications are direct (e.g., with all slots filled, connections 621, 623 and 631 would not be relied upon for communications, and only direct communication connections 619, 625, 627 and 633 would be relied upon, each carrying one-quarter of the IO parallel bus width, e.g., 16 bits assuming a 64 bit wide bus, 32 bits assuming a 128 bit wide bus, and so forth). The detection of memory modules present, identification of configuration and associated index, provision of a lookup table with appropriate timing parameters, and provision of information needed to configure memory may all be handled via instructions stored on machine readable media; for example, the memory subsystem may include firmware 641 for use by a dedicated controller or, alternatively, these functions may also be performed by a master system BIOS, as indicated by a dashed line block 643.

As mentioned above, each connection path 619, 621, 623, 625, 627, 631 and 633 may be configured as a parallel data bus of consistent size; assuming a 64 bit wide IO bus for example, each of these connections may be made to be 32 bits wide. In the event that communications are routed through three continuity modules (using the relatively indirect approach discussed above), the memory controller 603 may be programmed to mask unused bits for data arriving for memory or being written to memory, and this functionality also may be contained as part of subsystem firmware 641.

FIGS. 7 and 8 provide an alternate illustration of memory expansion systems employing dynamic point-to-point memory and providing timing parameter adjustment dependent upon the configuration of memory. In particular, FIG. 7 shows a system having two inserted memory modules 701 and 703 and two continuity modules 705 and 707. By contrast, FIG. 8 shows a memory system in which four memory modules 801, 803, 805 and 807 have been inserted, the latter two taking the places that might have otherwise been occupied by continuity modules. As indicated in FIG. 7, each memory module 701 and 703 may be configured to store data in parallel, with each module storing columns of one-half each data row. As indicated by a dashed line 702, a direct data connection between the two memory modules would not be relied upon in this two-module system, although each memory module would be coupled to system IO both directly via paths 711 and 713, respectively, and indirectly through continuity modules, via paths 714/715 and 716/717 respectively. As indicated by the notation "$\Phi_i$," a first clock speed may be applied to this configuration. In the configuration depicted in FIG. 8, by contrast, it will be noted that no continuity modules are present, and that none of dashed line inter-slot connections 802, 814 and 816 are used. All memory connections to system IO 809 are direct in this configuration, and a second, faster clock speed of $\Phi_j$ is used.

As indicated earlier, it may be preferred in some implementations to test for module presence at system initialization, and to responsively configure subsystem timing. These functions may be performed at a subsystem level, e.g., by a dedicated memory controller, or it may also be performed by system BIOS (such as when a computer system is powered on). FIG. 9 is used to explain the basic functions of such an initialization and configuration routine 901.

As seen in FIG. 9, a configuration routine may be called any time a memory change is detected, e.g., if the user adds, removes or moves a module. The routine may be designed to simply check whether such a change is detected (and return if no change is detected relative to prior configuration) or, alternatively, the routine may be designed to always perform configuration determination steps at initialization, irrespective of whether change has actually occurred. As indicated by functional block 903, instructions may "look for" a Serial Presence Detect ("SPD") area at each possible memory location or just at those locations where change is specifically detected. The system may then proceed to identify a mode of operation, as indicated by numeral 905.

In a relatively straightforward design, the system may be configured to only accept a small number of pre-selected modules, such as might fit into a proprietary expansion slot; if this design choice is taken, further module detection and memory configuration processes can be simplified, as system design can assume that only a small number of known modes can be presented. Alternatively, if desired the system may be made more robust, to "on-the-fly" detect memory sizes for a large number of possible modules, via SPD interrogation, and to optimize a much greater range of memory possibilities and estimate a maximum clock speed for the identified configuration, also "on-the-fly." For example, the system could configure two blocks of identical memory size for parallel storage in different modules, while reserving other memory addresses for different (e.g., non-parallel) treatment. During the configuration process 905, the system first identifies the information (such as mode) it will need to select a timing parameter for system operation. In a system where predetermined modules only can be connected, code architecture can easily determine mode based on a small set of choices. For example, in a memory system adapted for expansion to four modules of like size, as few as three modes might be used (e.g., used data connection paths pass through at most 0, 1 or 2 continuity modules). More sophisticated systems can readily be created to match a specific application, or provide greater granularity if desired. In these systems, one embodiment of the code may be designed to analyze continuity using a tree structure approach (i.e., by computing each possible connection path used in the configuration and the number of continuity modules passed through) based on known memory and continuity module locations, and then to compute a mode index based on the maximum continuity modules in any path, or based on some other metric. A mode index may be designed to have one-to-one or many-to-one correspondence with memory configuration—for example, in a hypothetical system where two memory modules have been inserted in arbitrary locations there may be different ways of configuring memory for a given mode. The analysis may select a mode index corresponding to this directness (i.e., to how clean the signal paths are in terms of minimizing transition artifacts attributable to signal path impedance variations, e.g., 0, 1 or 2 in the simplified example given above), notwithstanding that there may be multiple configurations that may correspond one of the indices.

With the mode index determined, the system as indicated by block 907 can then configure memory by reassigning different columns of memory to different memory devices or modules in a manner supported by the tree structure model. Configuration of memory typically will involve defining row and column size (such as depicted by reference numerals 329, 603 and 709 of FIGS. 3, 6 and 7 respectively) which permit software or firmware to configure chip select and data multiplexing circuitry, and to responsively store this data in both of the memory controller and each module present, all as indicated by reference numeral 909 in FIG. 9. Finally, the system masks those data bits corresponding to unused direct connection paths with each expansion connector or slot, given the mode of operation. For example, it was previously mentioned that for a hypothetical row width of 64 bits with four memory modules present, each bus could be made to be full bus width or half bus width (e.g., 64 bits or 32 bits) to provide for flexibility in application. However, a point-to-point system might only depend upon 16 bit lines for each connection path; because each direct connection path will have a dedicated set of interface pins coupling it to system IO, the system ideally masks the unused bits, both at the controller and at each memory module, as indicated by processing block 911. This masking may be performed at the controller level via a simple software mask, or as alluded to earlier, via programmatic control of a multiplexer that routes data communications; at each memory module present in the system, this mask and other data parameters may be programmed using a Serial Presence Detect ("SPD") or equivalent functionality.

FIG. 10 provides a block diagram 1001 used to illustrate configuration from the perspective of each memory module. In particular, at system initialization, a dedicated subsystem controller or system BIOS attempts to write to each memory module position in a sequential manner, using a serial data bus (e.g., present as part of communication lines 307, 309 and 615-618 in FIGS. 3 and 6). Conventionally, each memory module will have EEPROM as called for by the SPD standard that can be accessed to identify manufacturer, size, chip select latency, and other parameters associated with each specific memory module. In the simple model mentioned earlier, where only one or a small number of predetermined modules can be read, the configuration code can equate a SPD response with operational presence of a specific memory module (e.g., if it receives any response to any query), per process 1003. In a more complex system, where different size memory modules or modules from different manufacturers can be accommodated, the SPD interaction can provide the controller with latency, memory size and other information that can be applied "on-the-fly" as mentioned earlier, to estimate a system clock based on memory configuration and latencies stored by the manufacturer in module SPD.

In lieu of a SPD interrogation, one embodiment also permits memory module interrogation using other forms of test —for example, the configuration code can test for module presence by performing a read-write or other test. For example, as indicated by numeral 1005 in FIG. 10, a system may optionally write data to RAM—if a subsequent data read confirms the presence of the specific data, or if the write returns a predetermined acknowledgement, such would be sufficient to determine basic module presence. In a simple model, the system can equate absence of memory or other component module with the presence of a continuity module, e.g., failure to detect a memory module can be inherently equated with continuity module presence; alternatively, the system can also be designed to affirmatively test for continuity module presence. These collective functions are indicated by reference numerals 1007 and 1009 in FIG. 10.

While the basic function of a continuity module is to provide a data connection between pairs of data pins, a continuity module could readily be configured as a powered design, for example, to provide an acknowledgement or SPD response that would identify the device as a continuity module.

Finally, as indicated by blocks 1011 and 1013 of FIG. 10, the controller may write parameters into the module's SPD memory to identify row and column configuration, and to provide data masks that may be used to discriminate signals appearing on unused data bus connections.

FIG. 11 shows a block diagram of a method 1101 for adjusting a timing parameter using the specific example of a memory subsystem clock, that is, a clock commonly distributed to all memory modules in the subsystem. As indicated previously, the subsystem clock may be redefined any time system memory configuration is changed. As indicated by the value "r" used in connection with the discussion of FIG. 6, a subsystem clock may be generated using rate multiplier circuitry, where a digital value ("r", e.g., an 8 bit value) may be written to a control buffer of a rate multiplier circuit. In this manner, the value can be used to scale an external system clock, to define a local clock speed that is a fraction of master system clock speed; for example, in the case of an eight bit value of "r", an input clock may be scaled by factors of $1/256$ to a pass through value of "1" (in which case clock speed is identical to input) as is conventionally known. In such an embodiment, an index value dependent on mode would then be used to retrieve from a lookup table an appropriate value of "r," as indicated by numerals 1103 and 1105 of FIG. 11. The configuration routine could instead or additionally be configured to set other timing parameters as appropriate. A clock rate multiplier is not the only means of deriving a subsystem clock, and other mechanisms may instead be used, including generating an independent clock and providing appropriate buffer circuitry for exchanging memory outside of a memory subsystem. Such alternatives will readily occur to those having skill in digital design.

One contemplated alternate form provides an improvement in a system having a memory interface adapted to receive memory, a data buffer, at least one data path coupling the interface with another memory element, and at least one data path coupling the interface with the buffer without connecting to the other memory element; the improvement is characterized by determining whether memory is operationally connected to the interface, setting a system memory timing parameter to reflect a first value if memory is operationally connected to the interface, and setting the system memory timing parameter to reflect a second value if memory is not operationally connected to the interface.

More particular forms of this embodiment are described as follows.

A first form operates on a system that is configured to not depend upon at least one data path coupling the interface with the other memory element when memory is operationally connected to the interface, where the improvement further includes defining the first value to reflect faster timing than the second value and using the memory timing parameter in performing memory data accesses; in such a system, an effect of the improvement is to cause faster data access value at times when the system does not depend upon at least one data path coupling the interface with the other memory element than when the system may depend upon each data path coupling the interface with the other memory element.

A second form may be applied to a system having a plurality of memory interfaces each adapted to receive a memory module, where at least one data path of each interface being operatively coupled to the data buffer and not to any other interface for receiving a memory module, and at least one data path of each interface being operatively coupled to a different interface adapted to receive a memory module. In such an embodiment, the improvement may be further characterized by determining whether each memory interface has a memory module present, determining a mode of operation depending upon memory modules present, and defining a clock speed for use in controlling memory operations in dependence upon memory modules present. Clock speed in this embodiment may be defined as a maximum when each memory interface has a memory module present, and as a lesser speed when at least one memory interface does not have a memory module present.

Still further, a third form may be characterized by further storing information in a look-up table that represents at least two predefined clock speeds, each clock speed representing maximum operating rate for a given configuration of memory modules present in the interfaces, by accessing the look-up table using an index derived from memory modules present, and by responsively setting clock speed used to access memory in dependence upon table contents and the index.

Having thus described several exemplary implementations, it will be apparent that various alterations, modifications, and improvements will readily occur to those skilled in the art. Applications to systems other than memory systems will readily occur to those skilled in the art. Within the field of memory, there are many possible applications to systems that do not employ dynamic point-to-point routing, or to adjustment of parameters other than clock rate. Taking a further example, it would be within the skill of a digital design engineer to employ live impedance testing of signal paths to measure or estimate transient delays on a "live" basis, without using a lookup table of predetermined values. Such an engineer could design a system that performs monitoring and reconfiguration at times other than during system initialization. Such alterations, modifications, and improvements, though not expressly described above, are nonetheless intended and implied to be within the spirit and scope of this disclosure.

Accordingly, the foregoing discussion is intended to be illustrative only, to provide an example of one particular method and system for configuring a digital system; other designs, uses, alternatives, modifications and improvements will also occur to those having skill in the art which are nonetheless within the spirit and scope of this disclosure, which is limited and defined only by the following claims and equivalents thereto.

The invention claimed is:

1. A memory system, comprising:
a first connector to receive a first memory module;
a second connector to receive a second memory module; and
a signaling rate adjustment mechanism to establish a first signaling rate for communications with the first memory module when the second connector is not coupled to the second memory module, and a second, faster signaling rate when the second connector is coupled to the second memory module.

2. The memory system of claim 1, wherein said system receives a continuity module in the second connector in lieu of the second memory module, further comprising a detection mechanism operative to detect presence of the continuity module in the second connector, wherein the signaling rate adjustment mechanism is operatively coupled to the detection mechanism to establish the first signaling rate when presence of the continuity module is detected in the second connector.

3. The memory system of claim 1, wherein:
the first connector is coupled to a first memory module; and
the system further comprises a continuity mechanism that is to connect at least two pins of the second connector when the second memory module is not coupled to the second connector.

4. A memory system utilizing a dynamic point-to-point connection topology, comprising:
a continuity module that may be replaced with a memory module; and
a timing parameter adjustment mechanism that causes the system to operate at a first signaling rate when the continuity module is present, and to operate at a second, faster signaling rate when the continuity module is replaced with the memory module.

5. The memory system according to claim 4, wherein said system further comprises instructions stored on machine-readable media that when executed cause said system to poll a location associated with the continuity module to determine whether the continuity module is present and to select a signaling rate in dependence on whether the continuity module is present.

6. A method of configuring a memory system, comprising:
identifying a memory system configuration selected from a first configuration and a second configuration, the second configuration representing more memory than the first; and
setting a memory system timing parameter in dependence upon the identified memory system configuration, including causing a signal rate used by the memory system to be faster for the second configuration than for the first configuration.

7. The method of claim 6, wherein:
identifying includes polling a module connector to determine whether a memory module is operationally coupled to the connector; and
the method further comprises setting the timing parameter to cause a faster signaling rate when the memory module is present than when the memory module is not present.

8. The method of claim 7, wherein:
polling includes determining whether a continuity module is coupled to the connector; and
identifying the configuration includes identifying the first configuration when a continuity module is coupled to the connector.

9. The method of claim 6, applied to dynamic point-to-point routing, and wherein:
identifying memory system configuration includes identifying memory changes; and
the method further comprises setting the signaling rate to be faster as data paths are dynamically configured so as to represent fewer impedance discontinuities.

10. The method of claim 9, wherein:
identifying includes identifying an index representing memory configuration; and
setting the timing parameter includes accessing a clock speed using the index, and using the accessed clock speed as a memory system clock upon which the signaling rate depends.

11. The method of claim 6, further comprising:
polling a connector to determine whether a continuity mechanism is coupling at least two pins of the connector;
routing data access for a portion of data bus width through the connector if a continuity mechanism is coupling at least two pins of the connector to thereby couple at least one data bus line between the pins; and
reallocating the portion of data bus width to memory operationally engaged with the connector if a memory module is operationally engaged with the connector.

12. In a system having a memory interface to provide a first data path to a first memory and to provide a second data path to connect to the first memory if a second optional memory is not present and to the second optional memory if present a method comprising:
determining whether the second memory is operationally connected to the second data path;
setting a system memory timing parameter to reflect a first value if the second memory is operationally connected to the second data path; and
setting the system memory timing parameter to reflect a second value if the second memory is not operationally connected to the second data path;
wherein communications via each of the first data path and the second data path are dependent on the system memory timing parameter.

13. The method of claim 12 wherein:
said method further comprises defining the first value to reflect faster timing than the second value; and
said method causes a faster signaling rate with the first memory at times when the second data path is operationally connected to the second memory.

14. A memory system, comprising:
a data bus having a width;
a first memory module;
the system optionally including a second memory module;

a memory configuration, wherein
   in a first mode wherein the second memory module is not connected, the data bus is to route data spanning the width to the first memory module, and
   in a second mode wherein the second memory module is connected, the data bus is to route data to each of the first memory module and the second memory module via mutually-exclusive subsets of the width of the data bus; and
  a system timing parameter selected in dependence upon whether the memory configuration reflects the first mode or whether the memory configuration represents the second mode.

15. The memory system of claim 14, wherein said memory system further comprises a memory controller to perform an initialization routine that includes polling the memory configuration to determine whether the second memory module is connected.

16. The memory system of claim 14, further comprising instructions stored on machine readable media, the instructions adapted to cause upon execution interrogation of the second memory module if operationally connected to the memory connector via one of (a) a serial presence detect, and (b) a test write operation and subsequent read operation.

17. The memory system of claim 14, wherein the timing parameter is clock speed, and wherein said system further comprises:
  a clock rate multiplier to receive an external clock and derive the memory clock dependent upon a scaling factor; and
  logic to cause selection of the scaling factor in dependence upon whether the the second memory module is connected, wherein said logic is to select the scaling factor to cause a faster clock speed when the second memory module is connected.

18. A memory controller having logic to:
  poll each of a plurality of possible memory unit locations to determine whether a memory unit is present at the respective location;
  identify a memory data timing parameter in dependence upon the number of memory units present; and
  apply the memory data timing parameter to govern data operations with each of the plurality of possible memory unit locations where a memory unit is present; and
  divide a data path width across the possible memory unit locations in a manner dependent on the possible memory unit locations in which a memory unit is present.

19. The memory controller of claim 18, wherein:
  said logic is to redefine data routing as an additional memory unit is added to a system configuration, including by masking predetermined bits of a data path coupling the memory controller with a previously-present memory unit and by leaving unmasked a subset of bits of the data path; and
  said logic is further to apply a faster signaling for the subset of bits after the additional memory unit is added to the system configuration.

20. The memory controller of claim 18, wherein said logic is to identify the memory data timing parameter by retrieving a value from memory using a serial presence detect operation.

21. The memory controller of claim 18, wherein said logic is to:
  poll each of the a plurality of possible memory unit locations to determine whether a continuity unit is present;
  configure at least one memory unit that is present at one of those possible memory unit locations by defining row width such that at least some data representing a data row width is passed through a continuity unit if present; and
  apply the memory data timing parameter by defining a slower signaling rate for data paths passing through a continuity unit.

22. A memory system, comprising:
a dynamic point-to-point routing memory subsystem; and
instructions stored on machine readable media that are adapted when executed to
  configure data storage operations depending on memory present, and define a variable data timing parameter associated with data storage operations for the memory subsystem in dependence upon the configuration of data storage operations, wherein said instructions are further adapted upon execution to define a signaling rate associated with the variable timing parameter for communicating with memory present in the memory subsystem, the signaling rate increasing as memory in the memory subsystem is expanded.

23. The memory system of claim 22, configured as a blade server, wherein:
  the memory subsystem includes couplings for at least four memory modules; and
  said instructions are further adapted when executed to
    poll at least three of the couplings to determine whether memory modules are operationally present, and
    define one of at least two alternate memory system clock speeds in dependence upon the memory modules operationally present.

24. The memory system of claim 22, wherein each of the couplings is configured to receive a dual in-line memory module (DIMM).

25. The memory system of claim 14, wherein the system timing parameter is data bus signaling rate, and wherein the memory system is to use a faster data bus signaling rate when the second memory module is connected than when the second memory module is not connected.

26. The memory system of claim 25, wherein the system is a dynamic point-to-point system that routes a portion of the width of the data bus through a path that is to connect to the first memory module only when the second memory module is not connected.

27. The memory controller of claim 18, wherein each memory unit is a memory module.

28. The memory controller of claim 18, wherein each memory unit is a memory device.

29. The method of claim 12, wherein each of the first memory and the second memory is a memory module.

30. The method of claim 12, wherein each of the first memory and the second memory is a memory device.

* * * * *